United States Patent Office 3,304,184
Patented Feb. 14, 1967

3,304,184
BREADSTUFF FLAVORING COMPOSITIONS AND METHODS OF MAKING THEM
Lazare Wiseblatt, Chicago, Ill., assignor to Research Corporation, New York, N.Y., a corporation of New York
No Drawing. Original application Oct. 10, 1962, Ser. No. 229,748, now Patent No. 3,268,555, dated Aug. 23, 1966. Divided and this application June 7, 1966, Ser. No. 535,628
8 Claims. (Cl. 99—90)

This application is a divisional application of my application Serial No. 229,748, filed October 10, 1962, now Patent No. 3,268,555.

This invention relates to novel flavoring compositions for use in foodstuffs and the like and to methods of making them.

I have found that a group of new and useful flavoring compositions may be made by reacting aliphatic ketols with amino acids or with certain decarboxylation products thereof such as pyrrolidine.

As one component of the reaction mixture any of the naturally occuring α-amino acids may be used, either in the racemic or in one of the optically active forms. Among the aliphatic ketols which may be used to produce useful compositions by the method of the invention are 1,3-dihydroxyacetone, 1-hydroxy-2-propanone, glyceraldehyde and their lower alkyl homologs and lower alkanoic esters such as acetylmethylcarbinol and the acetic acid ether of 1-hydroxy-2-propanone, respectively.

In general, the character of the flavoring composition obtained is affected more by the amino acid used than by the ketol. Most of the different amino acids produce compositions of typically different character and strength but most of the compositions have a pleasing aroma except those obtained from sulfur containing acids such as cysteine. Pyrrolidine gives a flavoring composition having a distinct cracker-like aroma like that obtained with its carboxylic acid derivative proline.

The reaction may be carried out in aqueous solution or in water-miscible or water-immiscible solvents such as ethyl alcohol, pyridine and toluene. Preferably the reaction is carried out in aqueous solution at a pH in the range from about 4 to about 8.5.

The following examples are illustrative of the principles of the invention:

Cracker flavor (A) *From proline.*—An aqueous solution containing approximately equimolar amounts of L-proline and 1,3-dihydroxy-acetone develops a brown color and distinctly crackerlike aroma on boiling for a few minutes. Prolonged boiling achieves only a moderate intensification of the aroma, while the solution becomes extremely dark. The aroma intensity achieved shows relatively little pH dependence within the pH range 4.0–8.5. Under more acidic conditions, the aroma synthesis and browning are both drastically inhibited, while under more basic conditions there arise objectionable odors, and browning becomes severe. Phosphate ions and potassium bromate both exhibit catalytic properties towards aroma production; the former, however, also catalyzes browning, while the latter must be limited to low concentrations if the reaction mixture is to be incorporated in bread doughs.

Proline and 1,3-dihydroxy-acetone react very satisfactorily in non-aqueous media to yield the cracker aroma. Ethyl alcohol, pyridine, and toluene are satisfactory solvents. In every instance, decarboxylation of the proline is evidenced by the vigorous evolution of carbon dioxide and a progressive development of basicity in the reaction mixture. When toluene is used, there is azeotropic distillation of water with the solvent, suggesting the splitting-out of water in a condensation reaction.

(B) *From pyrrolidine.*—One-half mole (35.6 grams) of ice-cold pyrrolidine is added dropwise to ½ mole (30 grams) of glacial acetic acid, with cooling in an ice bath. When all the pyrrolidine has been added, the resulting golden-yellow syrup is warmed gently on a water-bath, and ½ mole (45 grams) of 1,3-dihydroxy-acetone is added in small portions. The condensation reaction is exothermic, and warming must be limited to prevent violent frothing.

After all the 1,3-dihydroxy-acetone has gone into solution, the reaction mixture is an opaque, viscous, dark-brown liquid. This is distilled at atmospheric pressure; distillate begins to come over at 102° C., and when the vapor temperature attains 110° C., there is a temporary cessation of distillation. The distillate boiling between 102°–110° C., about 20 ml. in volume, contains most of the desired aroma compound, together with acetic acid and water. To isolate the aroma compound, the distillate is neutralized with sodium bicarbonate, saturated with salt, and the product extracted into chloroform. The extract is dried over anhydrous sodium sulfate and evaporated under vacuum to remove the solvent. The yield is about 3 grams.

The following table lists the aromas of the flavoring compositions produced by boiling aqueous mixtures of 1,3-dihydroxy-acetone with other amino acids:

| Amino acid: | Description of aroma |
|---|---|
| Lysine | Strong, like dark corn syrup. |
| Valine | Strong, yeasty, protein hydrolysate. |
| Alanine | Weak, caramel. |
| Glutamic acid | Moderate, chicken broth. |
| Aspartic acid | Very weak. |
| Arginine | Very weak. |
| Hydroxyproline | Weak, vaguely like proline. |
| Phenylalanine | Very strong, hyacinth. |
| Leucine | Strong, cheesy, baked potato. |
| Isoleucine | Moderate, crust. |
| Serine | Weak, vaguely breadlike. |
| Threonine | Very weak. |
| Methionine | Baked potato. |
| Glycine | Baked potato. |
| Histidine | Very weak. |
| Tryptophan | Strong, indole. |
| Tyrosine | Very weak. |

Modified flavors may be made by using various mixtures of amino acids in suitable proportions.

The method of the invention may be utilized either by adding the appropriate reactants to the food batch prior to baking or cooking, so that the baking or cooking provides the heat required for flavor generation, or by preforming the flavoring compositions in a suitable liquid reaction medium which may be blended into the food batch either as such or after concentration of the flavor substances.

For example, when an aqueous solution of proline and 1,3-dihydroxy-acetone was boiled for 15 minutes and added to a chemically-leavened instant bread mix developed by the Quartermaster Food and Container Institute for the Armed Forces at a level equivalent to 0.0375% proline and 0.03% 1,3-dihydroxy-acetone (based on flour weight), the bread with this addition was ranked best in flavor of any of the levels tested and far superior to the control. The flavor improvement was even more notable when toast was made from these breads.

A further improvement resulted when the proline-1,3-dihydroxy-acetone preboiled mixture was added together with 0.005% each of isoleucine, valine and alanine, and 0.0013% of 1,3-dihydroxy-acetone; the fresh bread had an aroma which seemed deficient only in the alcoholic character of normally flavorful yeast-leavened bread.

Thus a formulation based on 100 pounds of flour would be prepared as follows:

17 grams of L-proline
13.6 grams of 1,3-dihydroxy-acetone
500 ml. of water
(Boil together for 15–20 minutes)

To the cooled solution add 2.25 grams each of alanine, valine and isoleucine, and 5.9 grams of 1,3-dihydroxy-acetone. Adjust the volume, if necessary, to 500 ml., or to one pint (whichever is most convenient). This mixture replaces an equal volume of water in the dough.

I claim:

1. A method of imparting flavor to breadstuffs which comprises incorporating in the breadstuff a compound selected from the group consisting of pyrrolidine and proline and an aliphatic ketol selected from the group consisting of 1,3-dihydroxyacetone, glyceraldehyde, acetylmethylcarbinol, 1-hydroxy-2-propanone and 1-hydroxy-2-propanone acetate and thereafter heating the breadstuff.

2. A method of imparting flavor to breadstuffs which comprises incorporating in the breadstuffs proline and an aliphatic ketol selected from the group consisting of 1,3-dihydroxyacetone, glyceraldehyde, acetylmethylcarbinol, 1-hydroxy-2-propanone and 1-hydroxy-2-propanone acetate and thereafter heating the breadstuff.

3. A method of imparting flavor to breadstuffs which comprises incorporating in the breadstuff proline and 1,3-dihydroxyacetone and thereafter heating the breadstuff.

4. A method of imparting flavor to breadstuffs which comprises incorporating in the breadstuff a flavoring composition obtained by heating a compound selected from the group consisting of pyrrolidine and proline with an aliphatic ketol selected from the group consisting of 1,3-dihydroxyacetone, glyceraldehyde, acetylmethylcarbinol, 1-hydroxy-2-propanone and 1-hydroxy-2-propanone acetate.

5. A method of imparting flavor to breadstuffs which comprises incorporating in the breadstuff a flavoring composition obtained by heating proline with an aliphatic ketol selected from the group consisting of 1,3-dihydroxyacetone, glyceraldehyde, acetylmethylcarbinol, 1-hydroxy-2-propanone and 1-hydroxy-2-propanone acetate.

6. A method of imparting flavor to breadstuffs which comprises incorporating in the breadstuff a flavoring composition obtained by heating pyrrolidine with an aliphatic ketol selected from the group consisting of 1,3-dihydroxyacetone, glyceraldehyde, acetylmethylcarbinol, 1-hydroxy-2-propanone and 1-hydroxy-2-propanone acetate.

7. A method of imparting flavor to breadstuffs which comprises incorporating in the breadstuff a flavoring composition obtained by heating proline with 1,3-dihydroxyacetone.

8. A method of imparting flavor to breadstuffs which comprises incorporating in the breadstuff a flavoring composition obtained by heating pyrrolidine with 1,3-dihydroxyacetone.

References Cited by the Examiner

UNITED STATES PATENTS 3,220,850  11/1965  Kirk _____ 99—90

A. LOUIS MONACELL, *Primary Examiner.*

H. H. KLARE, *Assistant Examiner.*